United States Patent
Peterson et al.

(10) Patent No.: US 12,407,008 B2
(45) Date of Patent: *Sep. 2, 2025

(54) FUEL CELL THROTTLE

(71) Applicant: Microsoft Technology Licensing, LLC, Redmond, WA (US)

(72) Inventors: Eric Clarence Peterson, Woodinville, WA (US); Sean Michael James, Olympia, WA (US); Nicholas Andrew Keehn, Kirkland, WA (US)

(73) Assignee: Microsoft Technology Licensing, Redmond, WA (US)

( * ) Notice: Subject to any disclaimer, the term of this patent is extended or adjusted under 35 U.S.C. 154(b) by 765 days.

This patent is subject to a terminal disclaimer.

(21) Appl. No.: 17/385,668

(22) Filed: Jul. 26, 2021

(65) Prior Publication Data

US 2021/0351423 A1 Nov. 11, 2021

Related U.S. Application Data

(63) Continuation of application No. 16/429,488, filed on Jun. 3, 2019, now Pat. No. 11,108,065.

(51) Int. Cl.
*H01M 8/04746* (2016.01)
*H01M 8/04082* (2016.01)
(Continued)

(52) U.S. Cl.
CPC ... *H01M 8/04753* (2013.01); *H01M 8/04201* (2013.01); *H01M 8/04395* (2013.01); *H01M 8/04619* (2013.01); *H01M 8/04992* (2013.01)

(58) Field of Classification Search
CPC ......... H01M 8/04753; H01M 8/04201; H01M 8/04395; H01M 8/04619; H01M 8/04992
See application file for complete search history.

(56) References Cited

U.S. PATENT DOCUMENTS

2002/0177016 A1* 11/2002 Okamoto ............ H01M 8/0612
429/415
2004/0053092 A1* 3/2004 Kato ................. H01M 8/04179
429/429
(Continued)

FOREIGN PATENT DOCUMENTS

CN 101119038 A 2/2008
CN 106463742 A 2/2017
(Continued)

OTHER PUBLICATIONS

Machine Translation of JPH0547399A (Mar. 11, 2024) (Year: 2024).*

(Continued)

*Primary Examiner* — Matthew J Merkling
(74) *Attorney, Agent, or Firm* — Mark K. Young; Mark Young P.C.

(57) ABSTRACT

The disclosed technology is generally directed to fuel cells. In one example of the technology, a fuel cell stack that includes an anode and a cathode causes a load to be driven. A control subsystem is measures at least one characteristic associated with the load, and to provide at least one control signal based, at least in part, on the at least one characteristic. An oxidizing agent input subsystem provides an oxidizing agent to the cathode of the fuel cell stack. A fuel input subsystem provides gaseous fuel to the anode of the fuel cell stack. The fuel input subsystem includes a fuel pump that is arranged to pump the gaseous fuel into the fuel input subsystem. A fuel-side high-speed valve adjusts mass flow of the gaseous fuel to the cathode of the fuel cell stack based on at least a first control signal of the at least one control signal.

13 Claims, 6 Drawing Sheets

(51) Int. Cl.
  *H01M 8/0438* (2016.01)
  *H01M 8/04537* (2016.01)
  *H01M 8/04992* (2016.01)

(56) References Cited

U.S. PATENT DOCUMENTS

| | | | | |
|---|---|---|---|---|
| 2004/0086765 | A1* | 5/2004 | Florence | H01M 8/04089 |
| | | | | 429/434 |
| 2004/0185315 | A1* | 9/2004 | Enjoji | H01M 8/04156 |
| | | | | 429/513 |
| 2006/0024540 | A1* | 2/2006 | LaVen | H01M 8/0494 |
| | | | | 429/432 |
| 2006/0115693 | A1* | 6/2006 | Toth | H01M 8/04992 |
| | | | | 429/444 |
| 2006/0210853 | A1* | 9/2006 | Fukuda | H01M 8/04552 |
| | | | | 429/432 |
| 2014/0017584 | A1 | 1/2014 | Schade | |
| 2019/0081340 | A1* | 3/2019 | Chikugo | H01M 8/04738 |
| 2019/0148748 | A1* | 5/2019 | Bozzolo | H01M 8/04365 |
| | | | | 429/439 |

FOREIGN PATENT DOCUMENTS

| | | |
|---|---|---|
| CN | 108493465 A | 9/2018 |
| JP | H053041 A | 1/1993 |
| JP | H0547399 A * | 2/1993 |
| JP | H0831439 A * | 2/1996 |
| JP | 2004087313 A * | 3/2004 |
| JP | 2007317469 A * | 12/2007 |

OTHER PUBLICATIONS

Machine Translation of JP H0831439A (Mar. 11, 2024) (Year: 2024).*
Machine Translation of JP 2004087313 A (Mar. 12, 2024) (Year: 2024).*
Machine Translation of JP 2007317469 A (Mar. 14, 2024) (Year: 2024).*
Communication pursuant to Article 94(3) received in European Application No. 20725275.0, mailed on Aug. 28, 2024, 5 pages.
Notice of Allowance Received in Chinese Patent Application No. 202080040983.5, mailed on Dec. 17, 2024, 04 pages (English Translation Provided).
Office Action Received for Chinese Application No. 202080040983.5, mailed on Feb. 5, 2024, 14 pages (English Translation Provided).
Second Office Action Received for Chinese Application No. 202080040983.5, mailed on Sep. 19, 2024, 18 pages. (English translation Provided).

* cited by examiner

FUEL CELL THROTTLE

CROSS-REFERENCE TO RELATED APPLICATION(S)

This application is a continuation of U.S. patent application Ser. No. 16/429,488, filed Jun. 3, 2019, entitled "FUEL CELL THROTTLE". The entirety of this afore-mentioned application is incorporated herein by reference.

BACKGROUND

Typically, fuel cells convert chemical energy from a fuel into electricity, by using an electrochemical process such as a chemical reaction of positively charged hydrogen ions or other fuel with oxygen or another oxidizing agent. Fuel cell operation typically depends on two supplies: a fuel supply which provides an ongoing source of fuel, and an oxidizing agent supply which provides an ongoing source of oxygen or other oxidizing agent to sustain the chemical reaction. The fuel is typically hydrogen, but other fuels may also be used. Various oxidizers may be used; in some cases, ambient air serves as an oxygen supply. Typically, unlike a battery, which eventually drains and must be recharged before further use as a power source, a fuel cell can produce electricity continuously as long as the necessary fuel and oxygen are supplied.

SUMMARY OF THE DISCLOSURE

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Briefly stated, the disclosed technology is generally directed to fuel cells. In one example of the technology, a fuel cell stack includes an anode, a cathode, and an electrolyte that is situated between the anode and the cathode. In some examples, the fuel cell stack is configured to cause a load to be driven based, at least in part, on a voltage difference between the anode and the cathode. In some examples, a control subsystem is arranged to measure at least one characteristic associated with the load, and to provide at least one control signal based, at least in part, on the at least one characteristic. In some examples, an oxidizing agent input subsystem is arranged to provide an oxidizing agent to the cathode of the fuel cell stack. In some examples, a fuel input subsystem is arranged to provide gaseous fuel to the anode of the fuel cell stack. In some examples, the fuel input subsystem includes a fuel pump that is arranged to pump the gaseous fuel into the fuel input subsystem. In some examples, a fuel-side high-speed valve is arranged to adjust mass flow of the gaseous fuel to the cathode of the fuel cell stack based on at least a first control signal of the at least one control signal.

Other aspects of and applications for the disclosed technology will be appreciated upon reading and understanding the attached figures and description.

BRIEF DESCRIPTION OF THE DRAWINGS

Non-limiting and non-exhaustive examples of the present disclosure are described with reference to the following drawings. In the drawings, like reference numerals refer to like parts throughout the various figures unless otherwise specified. These drawings are not necessarily drawn to scale.

For a better understanding of the present disclosure, reference will be made to the following Detailed Description, which is to be read in association with the accompanying drawings, in which.

DETAILED DESCRIPTION

Figure 1:
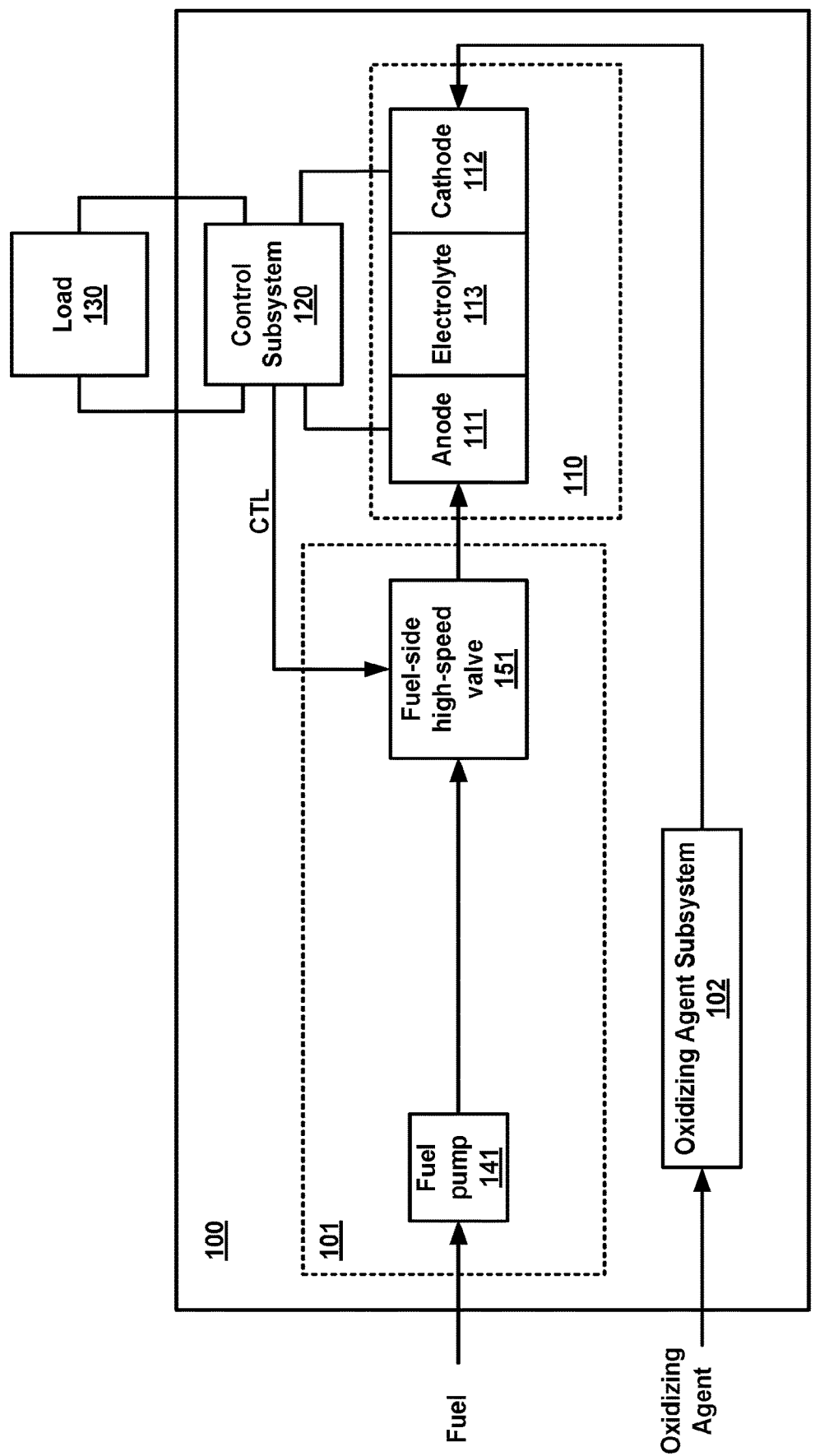
FIG. 1 is a block diagram illustrating an example fuel cell and load.

The following description provides specific details for a thorough understanding of, and enabling description for, various examples of the technology. One skilled in the art will understand that the technology may be practiced without many of these details. In some instances, well-known structures and functions have not been shown or described in detail to avoid unnecessarily obscuring the description of examples of the technology. It is intended that the terminology used in this disclosure be interpreted in its broadest reasonable manner, even though it is being used in conjunction with a detailed description of certain examples of the technology. Although certain terms may be emphasized below, any terminology intended to be interpreted in any restricted manner will be overtly and specifically defined as such in this Detailed Description section. Throughout the specification and claims, the following terms take at least the meanings explicitly associated herein, unless the context dictates otherwise. The meanings identified below do not necessarily limit the terms, but merely provide illustrative examples for the terms. For example, each of the terms "based on" and "based upon" is not exclusive, and is equivalent to the term "based, at least in part, on", and includes the option of being based on additional factors, some of which may not be described herein. As another example, the term "via" is not exclusive, and is equivalent to the term "via, at least in part", and includes the option of being via additional factors, some of which may not be described herein. The meaning of "in" includes "in" and "on." The phrase "in one embodiment," or "in one example," as used herein does not necessarily refer to the same embodiment or example, although it may. Use of particular textual numeric designators does not imply the existence of lesser-valued numerical designators. For example, reciting "a widget selected from the group consisting of a third foo and a fourth bar" would not itself imply that there are at least three foo, nor that there are at least four bar, elements. References in the singular are made merely for clarity of reading and include plural references unless plural references are specifically excluded. The term "or" is an inclusive "or" operator unless specifically indicated otherwise. For example, the phrases "A or B" means "A, B, or A and B." As used herein, the terms "component" and "system" are intended to encompass hardware, software, or various combinations of hardware and software. Thus, for example, a system or component may be a process, a process executing on a computing device, the computing device, or a portion thereof.

Briefly stated, the disclosed technology is generally directed to fuel cells. In one example of the technology, a fuel cell stack includes an anode, a cathode, and an electrolyte that is situated between the anode and the cathode. In some examples, the fuel cell stack is configured to cause a load to be driven based, at least in part, on a voltage difference between the anode and the cathode. In some examples, a control subsystem is arranged to measure at least one characteristic associated with the load, and to provide at least one control signal based, at least in part, on the at least one characteristic. In some examples, an oxidizing agent input subsystem is arranged to provide an oxidizing agent to the cathode of the fuel cell stack. In some examples, a fuel input subsystem is arranged to provide gaseous fuel to the anode of the fuel cell stack. In some examples, the fuel input subsystem includes a fuel pump that is arranged to pump the gaseous fuel into the fuel input subsystem. In some examples, a fuel-side high-speed valve is arranged to adjust mass flow of the gaseous fuel to the cathode of the fuel cell stack based on at least a first control signal of the at least one control signal.

In some examples, a fuel cell includes a pump to bring fuel into the system and a high-speed valve near the stack to adjust mass flow of the fuel into the stack based detected load changes. In some examples, this allows the fuel cell to follow load changes relatively quickly, such as on the order of milliseconds.

Illustrative Fuel Cell

FIG. 1 is a diagram of an example of fuel cell 100 and load 130. Fuel cell 100 may be any suitable type of fuel cell. Fuel cell 100 may include fuel cell stack 110, control subsystem 120, fuel input subsystem 101, and oxidizing agent input subsystem 102. Fuel cell stack no may include anode in, cathode 112, and electrolyte 113. Fuel input subsystem 101 may include fuel pump 141 and fuel-side high-speed valve 151.

In fuel cell stack 110, in some examples, electrolyte 113 is situated between anode in and cathode 112. Fuel cell stack no may be configured to cause load 130 to be driven based, at least in part, on a voltage difference between anode in and cathode 112. In some examples, fuel cell stack no is in a hot box and is at a substantially higher temperature than the rest of fuel cell 100 during normal fuel cell operation. Fuel cell stack no may receive a fuel from fuel input subsystem 101 and an oxidizing agent from oxidizing agent subsystem 102. The internal fuel may be, for example, hydrogen, carbon monoxide, or the like. In some examples, the external fuel provided may a fuel that reacts inside the hot box to provide the internal fuel—for instance, in some examples, the external fuel may be a hydrocarbon such as methane that reacts to form hydrogen and carbon monoxide, and in turn hydrogen and carbon monoxide act as the internal fuel.

The oxidizing agent may be, for example, oxygen or an oxide. The oxidizing agent may be a gas, such as air, that includes oxygen. The fuel cell stack may rely upon a chemical reaction, such as the combination of hydrogen and oxygen to form water, or the reaction of carbon monoxide and oxygen to form carbon dioxide.

Electrolyte 113 may allow ions to move between anode 111 and cathode 112 of fuel cell stack no. At anode in, a catalyst may cause the fuel to undergo oxidation reactions that generate ions and electrons. The ions may move from anode in to cathode 112 through electrolyte 113. At the same time, electrons may flow from anode in to cathode 112 through load 130, producing a current. At cathode 112, another catalyst may cause ions, electrons, and the oxidizing agent to react, forming outputs of the chemical reaction, such as water in the case of hydrogen and oxygen. During operation, cell stack no may provide a voltage drop of about 0.7 V between anode in and cathode 112, where the voltage drop may vary based on the load and other factors.

Control subsystem 120 is arranged, in some examples, to measure at least one characteristic associated with load 130, such as current, voltage, and/or the like, and to provide one or more control signals based, at least in part, on the measured characteristics. In some examples, a look-up table may be used to provide one or more of the control signals based on the measured characteristics.

In some examples, oxidizing agent input subsystem 102 is arranged to provide the oxidizing agent to cathode 112 of fuel cell stack no. In some examples, fuel input subsystem 101 is arranged to provide the fuel to cathode in of fuel cell stack no. In some examples, fuel pump 141 is arranged to pump the fuel into fuel input subsystem 101, where the fuel is a gaseous fuel. In some examples, fuel-side high-speed valve 151 is arranged to adjust mass flow of the gaseous fuel to anode of the stack based on at least one of the control signals (e.g., control signal CTL) provided by control subsystem 120. For instance, in some examples, fuel-side high speed valve 151 is controlled to adjust the mass flow of the fuel provided to fuel cell stack 110 based on the load current and load voltage, with those values provided to a look-up table, so that a change in load is followed relatively quickly, such as in a time frame of milliseconds.

Figure 2:
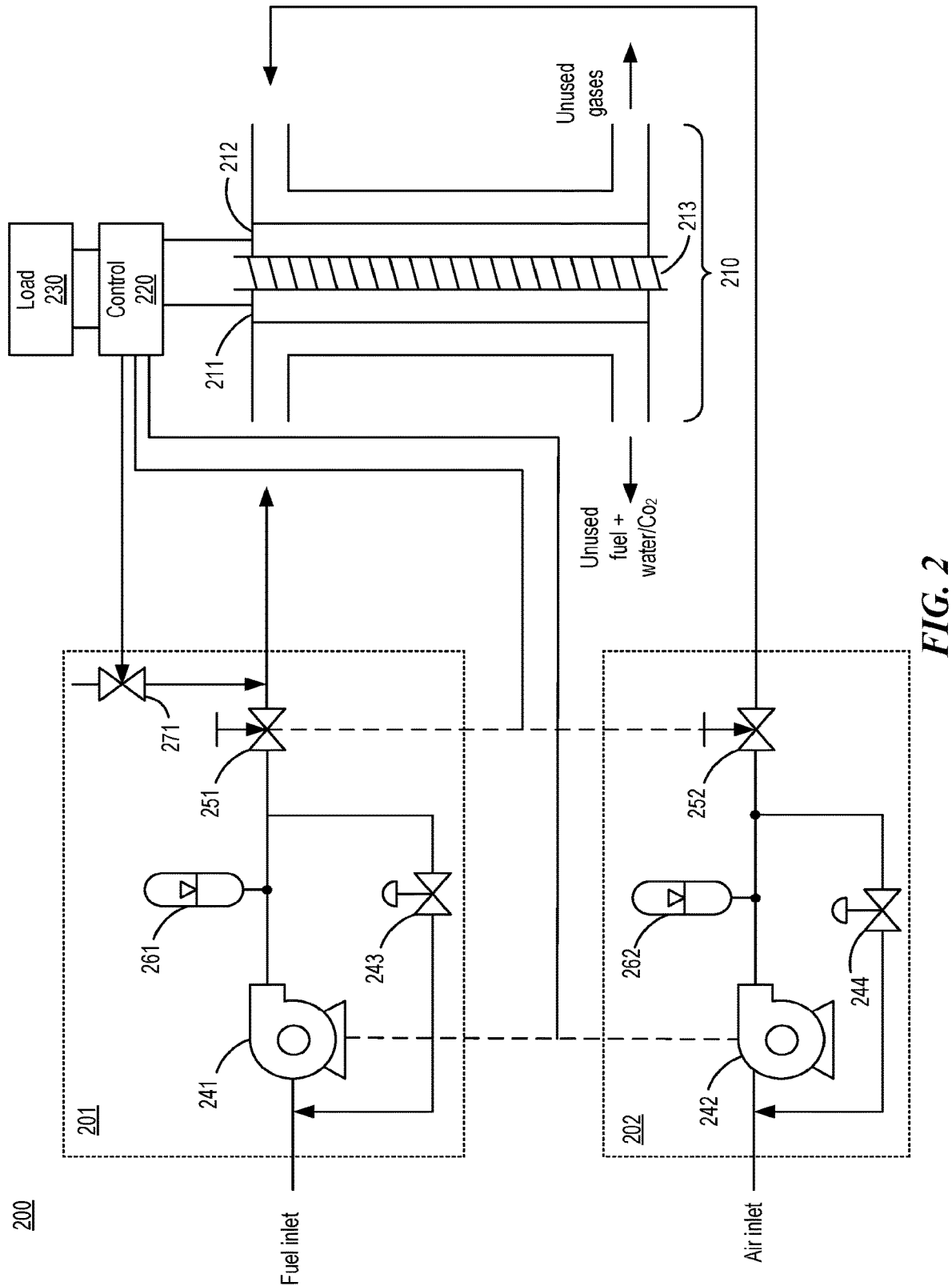
FIG. 2 is a block diagram illustrating an example of the fuel cell and load of FIG. 1.

FIG. 2 is a diagram of an example of fuel cell 200 and load 230, which may be examples of fuel cell 100 and load 130 of FIG. 1. Fuel cell 200 may include fuel cell stack 210, control subsystem 220, fuel input subsystem 201, and oxidizing agent input subsystem 202. Fuel cell stack 210 may include anode 211, cathode 212, and electrolyte 213. Fuel input subsystem 201 may include fuel pump 241, pressure regulator 243, fuel accumulator 261, fuel-side high-speed valve 251, and heated nitrogen purge subsystem 271. Oxidizing agent input subsystem 202 may include oxidizing agent pump 242, pressure regulator 244, oxidizing agent accumulator 262, and oxidizing-agent-side high-speed valve 252.

In some examples, fuel pump 241 and oxidizing agent pump 242 are variable speed pumps, with the speed of fuel pump 241 linked with the speed of oxidizing agent pump 242, with each being controlled based on one of the control signals provided by control subsystem 220. In some examples, fuel pump 241 is arranged to increase the pressure of the fuel from the fuel inlet into fuel cell 200, and oxidizing agent pump 242 is arranged to increase the pressure of the oxidizing agent from the oxidizing agent inlet into fuel cell 200. Fuel input subsystem 201 may include one or more pipes through which the gaseous fuel passes, and oxidizing input subsystem 202 may include one or more pipes through which the oxidizing agent, such as air or a solid oxide, passes.

In some examples, pressure regulator 243 is arranged to regulate the pressure of the fuel into fuel cell 200, and pressure regulator 244 is arranged to regulate the pressure of the oxidizing agent into fuel cell 200. In some examples, pressure regulator 243 is part of a return line that bypasses around pump 241 to ensure that flow of fuel into fuel cell 200 is the correct volume and ratio. In some examples, pressure regulator 244 is part of a return line that bypasses around pump 242 to ensure that flow of oxidizing agent into fuel cell 200 is the correct volume and ratio. In some examples, pressure regulator 243 is part of fuel pump 241, and in other examples, pressure regulator 243 is separate from fuel pump 241. Similarly, in some examples, pressure regulator 244 is part of fuel pump 242, and in other examples, pressure regulator 244 is separate from fuel pump 242.

In some examples, fuel-side high-speed valve 251 is arranged to control mass flow of the fuel to fuel cell stack 210 based on control provided by control subsystem 220. In some examples, oxidizing-agent-side high-speed valve 252 is arranged to control mass flow of the oxidizing agent to fuel cell stack 210 based on control provided by control subsystem 220. The control provided to high-speed valves 251 and 252 may be provided by control subsystem 220 via feedback based on load 230, such as by pulse width modulation (PWM) or other suitable type of feedback. In some examples, the control provided to high-speed valve 251 and high-speed valve 252 are mechanically and/or electrically linked. In this way, in some examples, high-speed valve 251 and high-speed valve 252 are synchronized with each other. One example of mechanical linkage would be one actuator controlling both high-speed valve 251 and high-speed valve 252. High-speed valve 251 and/or high-speed valve 252 may each be a high-speed needle valve, a high-speed butterfly valve, or other suitable high-speed valve.

In some examples, the high-speed valves 251 and 252 are each close to fuel cell stack 210. In some examples, each high-speed valve (251 and 252) includes an actuator that is outside of the hot box, along with a long shaft or plunger that goes inside the hot box, opening up into a valve inside the hot box, so that the opening of the high-speed valve is inside the hot box. The actuator may include electronics, a motor that turns the valve, and/or the like. Also, control associated with the high-speed valve may be outside of the hot box.

As discussed above, in some examples, the hot box contains the fuel cell stack 210, which reacts at a high temperature, with the heat box being a well-insulated containing the high-temperature stack and providing insulative protection from high temperatures to the rest of the fuel cell, keeping the heat inside the hot box during operation of the fuel cell. In some examples, the electronics are kept outside of the hot box. In some examples, pumps 141 and 142 are also kept a certain distance away from the hot box to avoid having pumps 141 and 142 from being at high temperature during fuel cell operation. That is, in some examples, while high-speed valves 251 and 252 are quite close to the fuel cell stack 210, almost right at the input of fuel cell stack 210, pumps 241 and 242 are relatively far from fuel cell stack 210.

Accumulator 261 may be arranged to handle pressure drops during the opening of valve 251 and the ramping up of pump 241 during high-speed load demand changes. Accumulator 261 stores fuel as high pressure. In this way, for example, if the pressure drops suddenly because the flow at valve 251 is open, accumulator 261 can provide additional pressure, or an additional buffer of fuel. In this way, in some examples, valve 251 and accumulator 261 work together to enable fuel cell 200 to adjust to rapid changes in the load—when valve 251 is open, a pressure drop may occur, and accumulator 261 may provide additional volume to ensure that the fuel can ramp up and compensate in time. Because the fuel is gaseous, in some examples, when the fuel is pressurized, the gas is compressed, so that it is possible to get more fuel mass through the pipe in fuel input subsystem 201.

Accumulator 262 may operate in a similar manner on the oxidizing agent side to provide an additional buffer of oxidizing agent, for example when the flow at valve 252 is open.

In some examples, a parallel fuel input may used instead of or in addition to accumulator 261. The parallel fuel input may provide a second path for fuel that joins the main path right near anode 211 of fuel cell stack 210, that opens up and begins injecting higher pressure fuel there if the load increases very quickly, and a staged system may be used in some examples.

In some examples, heated nitrogen purge subsystem 271 may be used to "de-throttle" fuel cell 200 in the event of an instantaneous loss of load, so as to prevent excess fuel from passing through the system. In some examples, heated nitrogen purge subsystem 271 may also be used in the event of a sudden and significant drop in the load, with the amount of heated nitrogen provided based on the drop in load as detected by control subsystem 120. In some examples, heated nitrogen purge subsystem 271 is used upon shutdown of fuel cell 100 to ensure that no further power is generated. Although FIG. 2 specifically shows a heated nitrogen purge subsystem, in other examples, a different purge subsystem may be employed, so that an inert gas other than nitrogen may be used for the purge.

As discussed above, control subsystem 220 may provide one or more control signals based on load current, load voltage, and/or the like. In some examples, other factors such as temperature of fuel cell stack 210, volumetric measurements on the oxidizing agent side, differential pressure, fuel flows, and/or the like may also be used by control subsystem 220, particularly for control of the oxidizing agent side. In some examples, pressure sensors may be used throughout the pipes on the fuel side and the oxidizing agent side and provide the output of the pressure sensors to control subsystem 220. Control subsystem 220 may provide control to both the fuel side and the oxidizing-agent side. In some examples, control of the oxidizing-agent side may ensure that no large pressure differential develops between the fuel side and the oxidizing-agent side.

Fuel cell stack 210 may output unused fuel, unused oxidizing agent, and one or more outputs of the chemical reaction, such as, for example, water. Although not shown in FIG. 2, rather than providing the voltage drop across anode 211 and cathode 212 directly to load 230, in some examples, a power regulator is first used to ensure that the output DC voltage is relatively constant, and the constant DC voltage output is applied to the stack. In some examples, where output AC power is required, an AC/DC converter may be used to convert the power to AC power before being applied to the load. In some examples, the output voltages of multiple stacks from multiple fuel cells may be connected in series. For instance, in some examples, a number of fuel cells may each provide a voltage drop across the respective anode and diodes of the fuel cell stack, with the voltage drop provided to a voltage regulator to provide a substantially constant voltage, with the voltage output of each of the power regulators coupled together to provide a combined voltage output that is provided across a load. When the load changes, each of the fuel cells may then follow the load accordingly at a range of speed of milliseconds based on the variable-speed pumps, accumulators, and high-speed valves present in each of the fuel cells that each provide a portion of the voltage to the load.

Fuel cell 210 may be used in any suitable fuel cell context, particularly a fuel cell context where dynamic load changes may occur. One example application for fuel cell 210 is for use in a data center, as shown below in accordance with one example in FIG. 3.

Illustrative Data Center

Figure 3:
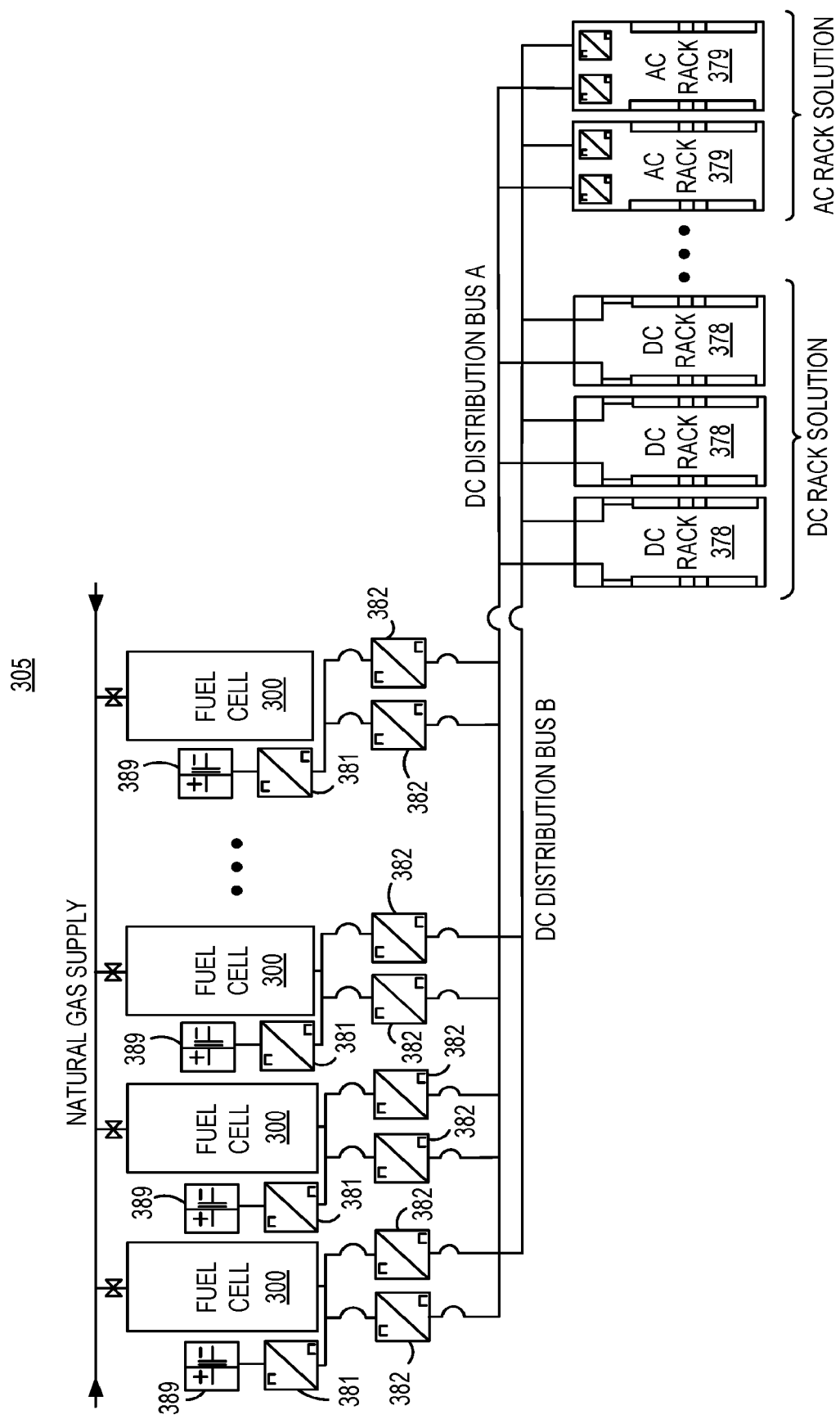
FIG. 3 is a block diagram illustrating a portion of an example data center in which example fuel cells of FIG. 1 and/or FIG. 2 may be used.

FIG. 3 is a diagram of a portion (305) of an example data center. Portion 305 may include fuel cells 300, batteries 389, voltage regulators 381, voltage regulators 382, DC racks 378, and AC racks 379. In some examples, data center services are provided by server racks including DC racks 378 and AC racks 379, where the fuel cells 300 are used as the power source for the server racks. Each fuel cell 300 has a corresponding battery 389 for fuel cell 300 in some examples. Voltage regulators 381 are used at the output of batteries 389 in some examples.

In some examples, the output of each fuel cell 300 goes to a corresponding voltage regulator 382, to provide a constant voltage output responsive to the received voltage output by the corresponding fuel cell 300. In some examples, the output of voltage regulators 382 are used to power DC racks 378 and AC racks 379, where each of the AC racks include a DC/AC converter. In the examples illustrated, a common fuel line comes in to provide gaseous fuel to each of the fuel cells 300. The gaseous fuel may be hydrogen gas, carbon monoxide gas, a fuel source that will react in fuel cell 300 to form a suitable fuel in the hot box of the fuel cell 300, or the like. In some examples, the server racks are powered on a row-by-row basis, with a row of server racks connected to a row of fuel cells. Other suitable arrangements are used in other examples.

FIG. 3 shows a particular example of a portion of an example data center. Various other examples of the disclosure may include more or less components than shown, and may vary according to various suitable manners.

Illustrative Computing Device

Figure 4:
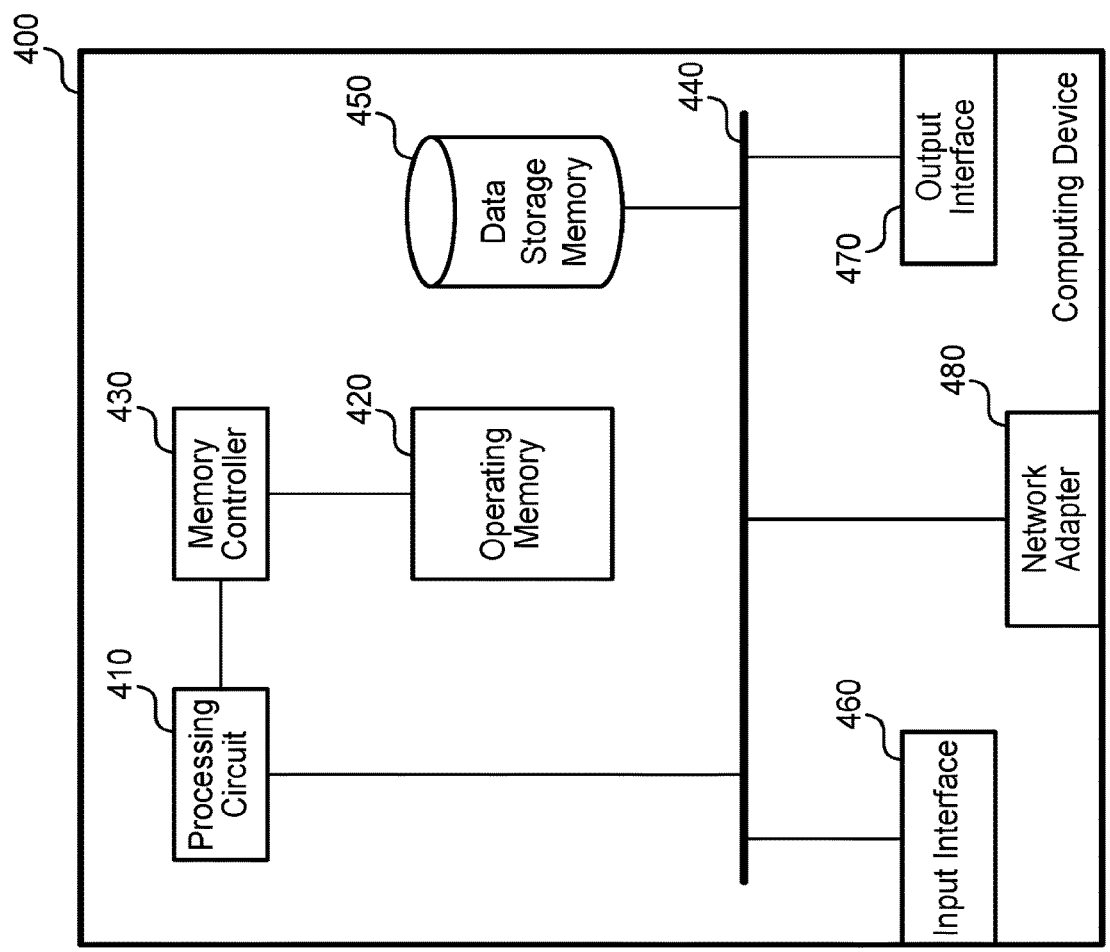
FIG. 4 is a block diagram illustrating one example of a suitable computing device.

FIG. 4 is a diagram illustrating one example of computing device 400 in which aspects of the technology may be practiced. Computing device 400 may be virtually any type of general- or specific-purpose computing device. In some examples, computing device 400 may be an example of a portion of control subsystem 220 of FIG. 2 and or control subsystem 120 of FIG. 1. As illustrated in FIG. 4, computing device 400 includes processing circuit 410, operating memory 420, memory controller 430, data storage memory 450, input interface 460, output interface 470, and network adapter 480. Each of these afore-listed components of computing device 400 includes at least one hardware element.

Computing device 400 includes at least one processing circuit 410 configured to execute instructions, such as instructions for implementing the herein-described workloads, processes, or technology. Processing circuit 410 may include a microprocessor, a microcontroller, a graphics processor, a coprocessor, a field-programmable gate array, a programmable logic device, a signal processor, or any other circuit suitable for processing data. Processing circuit 410 is an example of a core. The aforementioned instructions, along with other data (e.g., datasets, metadata, operating system instructions, etc.), may be stored in operating memory 420 during run-time of computing device 400. Operating memory 420 may also include any of a variety of data storage devices/components, such as volatile memories, semi-volatile memories, random access memories, static memories, caches, buffers, or other media used to store run-time information. In one example, operating memory 420 does not retain information when computing device 400 is powered off. Rather, computing device 400 may be configured to transfer instructions from a non-volatile data storage component (e.g., data storage component 450) to operating memory 420 as part of a booting or other loading process.

Operating memory 420 may include $4^{th}$ generation double data rate (DDR4) memory, $3^{rd}$ generation double data rate (DDR3) memory, other dynamic random-access memory (DRAM), High Bandwidth Memory (HBM), Hybrid Memory Cube memory, 3D-stacked memory, static random-access memory (SRAM), or other memory, and such memory may comprise one or more memory circuits integrated onto a DIMM, SIMM, SODIMM, or other packaging. Such operating memory modules or devices may be organized according to channels, ranks, and banks. For example, operating memory devices may be coupled to processing circuit 410 via memory controller 430 in channels. One example of computing device 400 may include one or two DIMMs per channel, with one or two ranks per channel. Operating memory within a rank may operate with a shared clock, and shared address and command bus. Also, an operating memory device may be organized into several banks where a bank can be thought of as an array addressed by row and column. Based on such an organization of operating memory, physical addresses within the operating memory may be referred to by a tuple of channel, rank, bank, row, and column.

Despite the above-discussion, operating memory 420 specifically does not include or encompass communications media, any communications medium, or any signals per se.

Memory controller 430 is configured to interface processing circuit 410 to operating memory 420. For example, memory controller 430 may be configured to interface commands, addresses, and data between operating memory 420 and processing circuit 410. Memory controller 430 may also be configured to abstract or otherwise manage certain aspects of memory management from or for processing circuit 410. Although memory controller 430 is illustrated as single memory controller separate from processing circuit 410, in other examples, multiple memory controllers may be employed, memory controller(s) may be integrated with operating memory 420, or the like. Further, memory controller(s) may be integrated into processing circuit 410. These and other variations are possible.

In computing device 400, data storage memory 450, input interface 460, output interface 470, and network adapter 480 are interfaced to processing circuit 410 by bus 440. Although, FIG. 4 illustrates bus 440 as a single passive bus, other configurations, such as a collection of buses, a collection of point to point links, an input/output controller, a bridge, other interface circuitry, or any collection thereof may also be suitably employed for interfacing data storage memory 450, input interface 460, output interface 470, or network adapter 480 to processing circuit 410.

In computing device 400, data storage memory 450 is employed for long-term non-volatile data storage. Data storage memory 450 may include any of a variety of non-volatile data storage devices/components, such as non-volatile memories, disks, disk drives, hard drives, solid-state drives, or any other media that can be used for the non-volatile storage of information. However, data storage memory 450 specifically does not include or encompass communications media, any communications medium, or any signals per se. In contrast to operating memory 420, data storage memory 450 is employed by computing device 400 for non-volatile long-term data storage, instead of for run-time data storage.

Also, computing device 400 may include or be coupled to any type of processor-readable media such as processor-readable storage media (e.g., operating memory 420 and data storage memory 450) and communication media (e.g., communication signals and radio waves). While the term processor-readable storage media includes operating memory 420 and data storage memory 450, the term "processor-readable storage media" (whether in the plural or singular form), throughout the specification and the claims, is defined herein so that the term "processor-readable storage media" specifically excludes and does not encompass communications media, any communications medium, or any signals per se. However, the term "processor-readable storage media" does encompass processor cache, Random Access Memory (RAM), register memory, and/or the like.

Computing device 400 also includes input interface 460, which may be configured to enable computing device 400 to receive input from users or from other devices. In addition, computing device 400 includes output interface 470, which may be configured to provide output from computing device 400. In one example, output interface 470 includes a frame buffer, graphics processor, graphics processor or accelerator, and is configured to render displays for presentation on a separate visual display device (such as a monitor, projector, virtual computing client computer, etc.). In another example, output interface 470 includes a visual display device and is configured to render and present displays for viewing. In yet another example, input interface 460 and/or output interface 470 may include a universal asynchronous receiver/transmitter ("UART"), a Serial Peripheral Interface ("SPI"), Inter-Integrated Circuit ("I2C"), a General-purpose input/output (GPIO), and/or the like. Moreover, input interface 460 and/or output interface 470 may include or be interfaced to any number or type of peripherals.

In the illustrated example, computing device 400 is configured to communicate with other computing devices or entities via network adapter 480. Network adapter 480 may include a wired network adapter, e.g., an Ethernet adapter, a Token Ring adapter, or a Digital Subscriber Line (DSL) adapter. Network adapter 480 may also include a wireless network adapter, for example, a Wi-Fi adapter, a Bluetooth adapter, a ZigBee adapter, a Long-Term Evolution (LTE) adapter, or a 5G adapter.

Although computing device 400 is illustrated with certain components configured in a particular arrangement, these components and arrangement are merely one example of a computing device in which the technology may be employed. In other examples, data storage memory 450, input interface 460, output interface 470, or network adapter 480 may be directly coupled to processing circuit 410, or be coupled to processing circuit 410 via an input/output controller, a bridge, or other interface circuitry. Other variations of the technology are possible.

Some examples of computing device 400 include at least one memory (e.g., operating memory 420) adapted to store run-time data and at least one processor (e.g., processing unit 410) that is adapted to execute processor-executable code that, in response to execution, enables computing device 400 to perform actions.

Illustrative Process

Figure 5A:
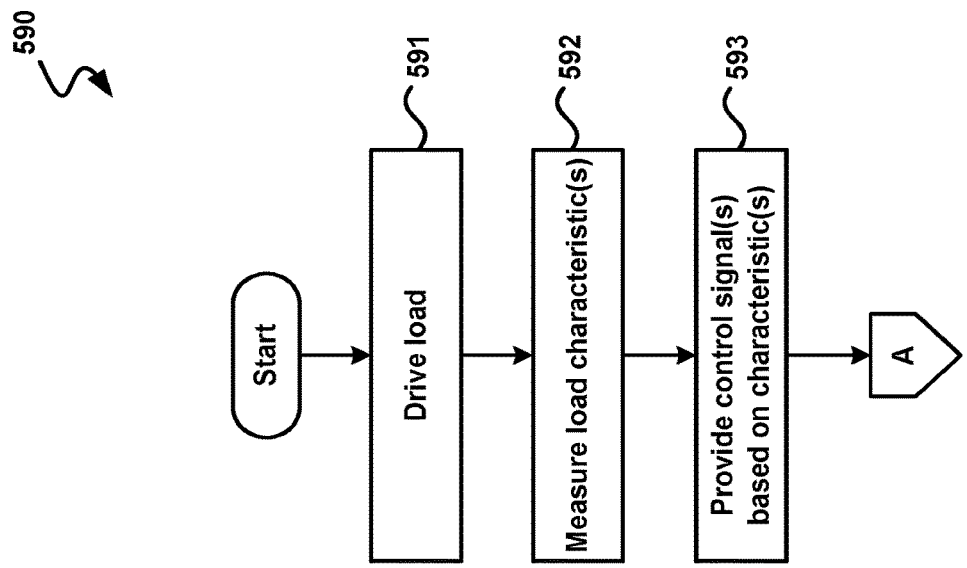
FIGS. 5A-5B are a flow diagram illustrating an example of a process for fuel cell throttling, in accordance with aspects of the present disclosure.
Figure 5B:
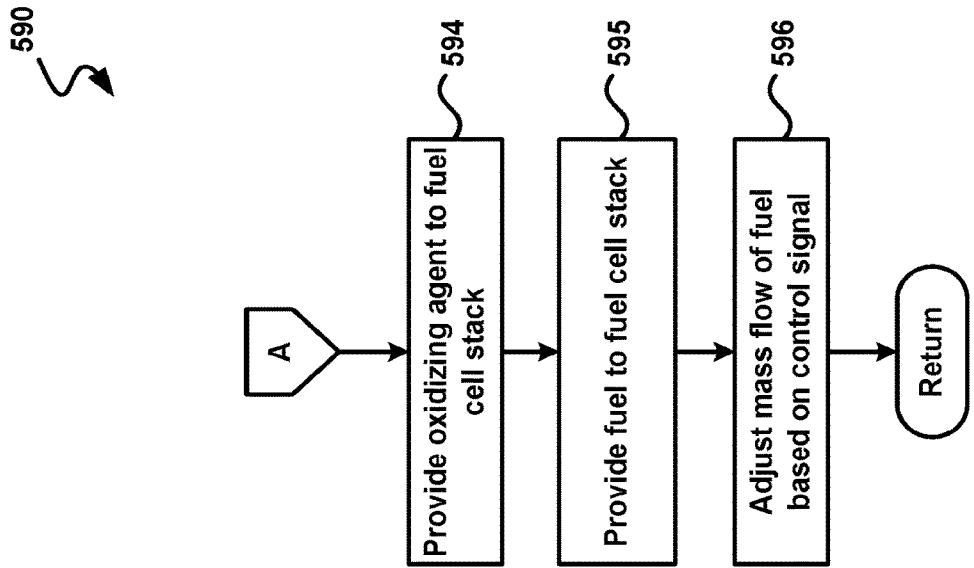

FIGS. 5A-5B illustrate an example dataflow for a process (590) for a fuel cell. In some examples, process 590 is performed by a device, such as fuel cell 100 of FIG. 1, fuel cell 200 of FIG. 2, or one or more of the fuel cells 300 of FIG. 3.

In the illustrated example, step 591 occurs first. At step 591, in some examples, a load is caused to be driven based, at least in part, on a voltage difference between an anode and a cathode of a fuel cell stack of a fuel cell. As shown, step 592 occurs next in some examples. At step 592, in some examples, at least one characteristic associated with the load is measured. As shown, step 593 occurs next in some examples. At step 593, in some examples, at least one control signal is provided based, at least in part, on the at least one characteristic.

As shown, step 594 occurs next in some examples. At step 594, in some examples, an oxidizing agent is provided to the cathode of the fuel cell stack. As shown, step 595 occurs next in some examples. At step 595, in some examples, gaseous fuel is pumped into the anode of the fuel cell stack. As shown, step 596 occurs next in some examples. At step 596, in some examples, mass flow of the gaseous fuel to the cathode of the fuel cell stack is adjusted based on at least a first control signal of the at least one control signal. The process may then advance to the return block, where other processing is resumed.

CONCLUSION

While the above Detailed Description describes certain examples of the technology, and describes the best mode contemplated, no matter how detailed the above appears in text, the technology can be practiced in many ways. Details may vary in implementation, while still being encompassed by the technology described herein. As noted above, particular terminology used when describing certain features or aspects of the technology should not be taken to imply that the terminology is being redefined herein to be restricted to any specific characteristics, features, or aspects with which that terminology is associated. In general, the terms used in the following claims should not be construed to limit the technology to the specific examples disclosed herein, unless the Detailed Description explicitly defines such terms. Accordingly, the actual scope of the technology encompasses not only the disclosed examples, but also all equivalent ways of practicing or implementing the technology.

We claim:

1. An apparatus, comprising:
at least one memory storing processor-executable code therein, and at least one processor that is adapted to execute the processor-executable code, wherein the processor-executable code includes processor-executable instructions that, in response to execution, enables the apparatus to perform actions, including:
measuring at least one characteristic associated with a load that is driven based, at least in part, on a voltage difference between an anode and a cathode of a fuel cell stack of a fuel cell, wherein the at least one characteristic associated with the load is at least one of a voltage of the load or a current of the load;
controlling pumping of gaseous fuel into the fuel cell;
providing a plurality of control signals based, at least in part, on the at least one characteristic, such that a first control signal causes an adjustment of mass flow of the gaseous fuel to the anode of the fuel cell stack and such that a second control signal causes control of the pumping of the gaseous fuel into the fuel cell;
controlling pumping of an oxidizing agent into the cathode of the fuel cell stack based on a third control signal;
adjusting a speed of the pumping of the oxidizing agent based on a fourth control signal; and
adjusting a speed of the pumping of the gaseous fuel into the fuel cell based on a fifth control signal,
wherein the speed of the pumping of the oxidizing agent and the speed of the pumping of the gaseous fuel are linked.

2. The apparatus of claim 1, the actions further including: storing the gaseous fuel; and providing the stored gaseous fuel to the fuel cell stack responsive to a drop in pressure in the gaseous fuel being pumped into the fuel cell.

3. The apparatus of claim 1, the actions further including: causing an adjustment of a speed of the pumping of the gaseous fuel into the fuel cell stack based, at least in part, on the second control signal.

4. The apparatus of claim 1, the actions further including: providing an inert gas to the anode of the fuel cell stack responsive to a sixth control signal.

5. The apparatus of claim 1, the actions further including: using a hot box that surrounds the fuel cell stack to insulate components outside of the hot box from high temperature inside the hot box.

6. The apparatus of claim 4, the actions further including adjusting a mass flow of the oxidizing agent into the cathode of the fuel cell stack based on a seventh control signal.

7. A method, comprising:
measuring at least one characteristic associated with a load that is driven based, at least in part, on a voltage difference between an anode and a cathode of a fuel cell stack of a fuel cell, wherein the at least one characteristic associated with the load is at least one of a voltage of the load or a current of the load;
controlling pumping of gaseous fuel into the fuel cell; and
providing a plurality of control signals based, at least in part, on the at least one characteristic, such that a first control signal causes an adjustment of mass flow of the gaseous fuel to the anode of the fuel cell stack and such that a second control signal causes control of the pumping of the gaseous fuel into the fuel cell;
controlling pumping of an oxidizing agent into the cathode of the fuel cell stack based on a third control signal;
adjusting a speed of the pumping of the oxidizing agent based on a fourth control signal;
adjusting a speed of the pumping of the gaseous fuel into the fuel cell based on a fifth control signal, and
wherein the speed of the pumping of the oxidizing agent and the speed of the pumping of the gaseous fuel are linked.

8. The method of claim 7, further comprising: storing the gaseous fuel; and providing the stored gaseous fuel to the fuel cell stack responsive to a drop in pressure in the gaseous fuel being pumped into the fuel cell.

9. The method of claim 7, further comprising: providing an inert gas to the anode of the fuel cell stack responsive to a sixth control signal.

10. A processor-readable storage medium, having stored thereon processor-executable code that, upon execution by at least one processor, enables actions, comprising:
measuring at least one characteristic associated with a load that is driven based, at least in part, on a voltage difference between an anode and a cathode of a fuel cell stack of a fuel cell, wherein the at least one characteristic associated with the load is at least one of a voltage of the load or a current of the load;
controlling pumping of gaseous fuel into the fuel cell; and
providing a plurality of control signals based, at least in part, on the at least one characteristic, such that a first control signal causes an adjustment of mass flow of the gaseous fuel to the anode of the fuel cell stack and such that a second control signal causes control of the pumping of the gaseous fuel into the fuel cell;
controlling pumping of an oxidizing agent into the cathode of the fuel cell stack based on a third control signal;
adjusting a speed of the pumping of the oxidizing agent based on a fourth control signal:
adjusting a speed of the pumping of the gaseous fuel into the fuel cell based on a fifth control signal, and
wherein the speed of the pumping of the oxidizing agent and the speed of the pumping of the gaseous fuel are linked.

11. The processor-readable storage medium of claim 10, the actions further comprising: causing linking an adjustment of mass flow of an oxidizing agent to a cathode of the fuel cell stack with the adjustment of the mass flow of the gaseous fuel to the anode of the fuel cell stack.

12. The processor-readable storage medium of claim 10, the actions further comprising: storing the gaseous fuel; and providing the stored gaseous fuel to the fuel cell stack responsive to a drop in pressure in the gaseous fuel being pumped into the fuel cell.

13. The processor-readable storage medium of claim 10, the actions further comprising: providing an inert gas to the anode of the fuel cell stack responsive to a sixth control signal.

* * * * *